United States Patent [19]
Gelardi et al.

[11] Patent Number: 5,631,790
[45] Date of Patent: May 20, 1997

[54] ENERGY ABSORBING VIDEO CASSETTE

[75] Inventors: Paul J. Gelardi, Kennebunkport; David A. Capotosto, Kennebunk; James R. Dussault, Kennebunkport, all of Me.

[73] Assignee: LCV Associates, Kennebunkport, Me.

[21] Appl. No.: 947,568

[22] Filed: Sep. 21, 1992

[51] Int. Cl.⁶ .................................................. G11B 23/02
[52] U.S. Cl. ........................................ 360/132; 242/347.1
[58] Field of Search ..................... 360/132, 137; 369/263; 242/197–199, 347, 347.1, 347.2; 206/387

[56] References Cited

U.S. PATENT DOCUMENTS

| | | | |
|---|---|---|---|
| 3,900,170 | 8/1975 | Serizawa | 360/132 |
| 4,235,395 | 11/1980 | Wardenaar et al. | 360/132 |
| 4,249,710 | 2/1981 | Dobbs et al. | 242/199 |
| 4,512,470 | 4/1985 | Sieben | 206/387 |
| 4,670,809 | 6/1987 | Teuber | 360/132 |
| 4,685,016 | 8/1987 | Baranski | 360/132 |
| 4,797,768 | 1/1989 | Oishi et al. | 360/132 |
| 4,916,565 | 4/1990 | Breuer et al. | 360/132 |
| 4,930,821 | 6/1990 | Jang | 360/132 |
| 5,026,000 | 6/1991 | Gelardi et al. | 242/199 |
| 5,043,974 | 8/1991 | Nakagawa | 369/291 |
| 5,082,197 | 1/1992 | Satoh et al. | 242/199 |

FOREIGN PATENT DOCUMENTS 8700321 10/1988 WIPO.

*Primary Examiner*—Stuart S. Levy
*Assistant Examiner*—B. E. Miller
*Attorney, Agent, or Firm*—James Creighton Wray

[57] ABSTRACT

An integrally molded video cassette is formed with an integral living hinge between the body of the cassette and the dust cover. An energy absorption zone formed near the hinge isolates the hinge from directly transferring high impact forces between the relatively low mass dust door cover and the high mass cassette body loaded with reels and tape. Energy absorption zones are formed of relatively thin wall areas with radiused intersections. One or more radiused grooves are formed in the wall sections.

12 Claims, 4 Drawing Sheets

ENERGY ABSORBING VIDEO CASSETTE

BACKGROUND OF THE INVENTION

Video cassettes are in wide use.

Conventional video cassettes widely in use at the time of the present invention have high parts counts which increases the cost of the manufacturer and assembly of the cassettes. Conventional video cassettes in use at the time of the present invention are made from high impact polystyrene materials, with sufficient size and strength to physically resist impact upon dropping.

This invention employs new integrally formed video cassettes made of polypropylene, which reduce cost and increase reliability of cassettes and provide lubricating qualities not available in previous conventional materials. The inventors have provided cassettes with integral living hinges so that the dust door may be integrally formed with the cassette body.

Impacting a new polypropylene cassette through mishandling or dropping the cassette over long distances onto hard floors requires the transferring of impact loads from the relatively low mass dust door, for example, through one or more hinges to the relatively high mass body which has been loaded with reels and tape.

While the hinges are capable of transferring such force, the present invention seeks to improve hinge life and operation.

SUMMARY OF THE INVENTION

The present invention employs energy absorption zones near the living hinges to slow shock loading of hinges and to provide smoother, less abrupt force transfer between the dust door and body during impact.

In solving problems of the present type, it might have been thought to be important to strengthen areas near a hinge. However, it has been determined that strengthening portions of the video cassette and dust door near the hinge, causes high shock loading on the hinge upon impact. The novel solution of the present invention is to build energy absorption features near the hinge. Those energy absorption features may be either between the hinge and the cover or between the hinge and the door. The latter is preferable. Upon impact, the energy absorption zone elastically collapses, dampening the shock to the hinge.

Each video cassette has a base and a top. A rear wall and side walls are connected to the base and the top. The cassette has a frontal tape-exposing area and a dust door for covering the tape-exposing area. Hinges are connected to the dust door for permitting the dust door to move between an upward tape-exposing position and a downward tape-covering position. Energy absorption zones are positioned near the hinges for absorbing impact and reducing transmission of impact energies between the door and body through the hinges.

The preferred energy absorption zones are integrally constructed in the dust door. The dust door has a frontal tape-covering wall and sides extending rearward from the frontal tape-covering wall. The hinges are connected to the sides of the dust door, and the energy absorption zones are in the sides near the hinges. The energy absorbing areas have thin walls connected with radiused curves, preferably as corrugations.

Preferably the energy absorption zones are formed as parallel grooves oppositely extending from outer and inner surfaces of the sides. An outer groove is formed in an outer surface of each side, and parallel inner grooves are formed on inner surfaces of each side.

The grooves extend generally parallel to the back wall and perpendicularly to the base and top.

The grooves extend fully between upper and lower edges of the dust door sides.

The energy absorption zones are formed in the body of the cassette near the hinges.

In another embodiment, thin walls have radiused curves forming horizontal grooves in the body connected to hinge attachments.

These and further and other objects and features of the invention are apparent in the disclosure, which includes the above and ongoing written specification, with the claims and the drawings.

DETAILED DESCRIPTION OF THE DRAWINGS

Figure 1:
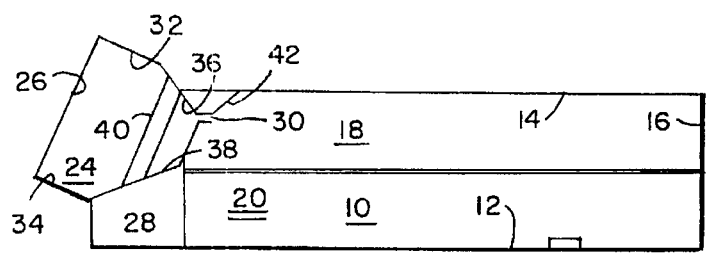
FIGS. 1 and 2 are side elevations of a video tape cassette of the present invention.
Figure 2:
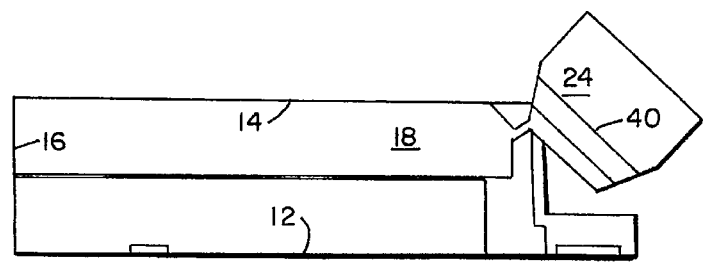

Referring to FIG. 1, a video tape cassette is generally indicated by the numeral 10. The cassette has a base 12, a top 14, a rear wall 16 and side walls 18. Together the base, top rear and side walls form a video cassette body 20 with a frontal opening 22. A dust door 24 is raised and lowered between an upper tape-exposing position and a lowered position in which front wall 26 covers the exposed tape. Dust door 24 has opposite side walls 28 which are connected by hinges 30 to the tape cassette body 20, in this case to an upper portion of the side wall 18. The dust door 24 side walls 28 have upper and lower edges 32 and 34, which include the sloping edges 36 and 38. The body 20, especially when loaded, has substantial mass, and the dust door 24 has relatively less mass. Upon moving the dust door 24 relative to the body 20 with an impact on the dust door, the impact places a stress force upon the hinge 30. To lessen that stress force, an energy absorption zone 40 is formed either in the dust door or in a forward portion 42 of the body 20.

Figure 3A:
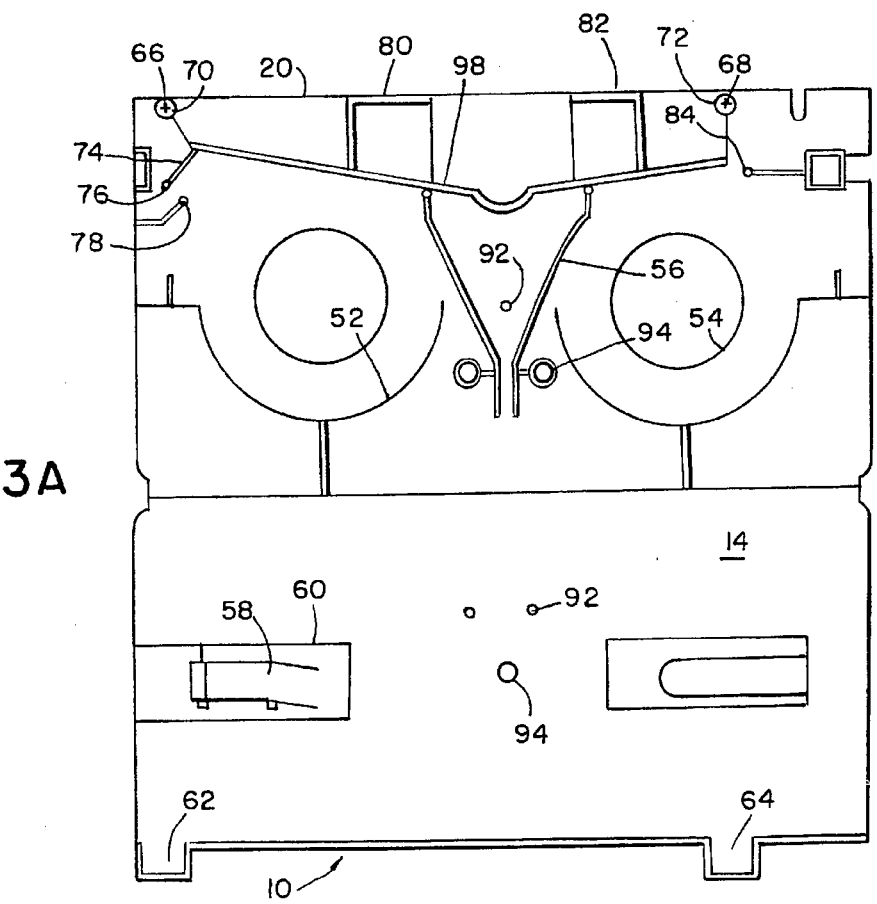
FIGS. 3A and 3B are inner and outer details of an open video cassette.
Figure 3B:
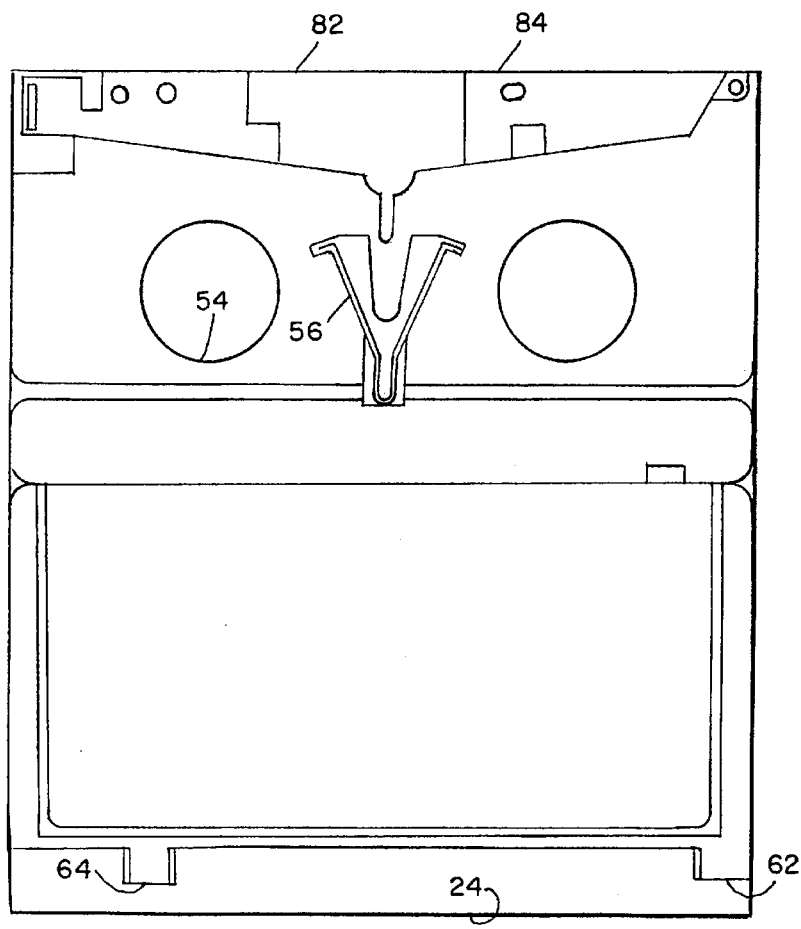

FIGS. 3A and 3B show inner and outer views of an integrally molded cassette which incorporates the present invention. Briefly, the base 12 of the cassette has reel-guiding walls 52 and hub-guiding openings 54, and a reel brake 56. The top 12 has integrally formed reel hub springs 58 which are held downward by doors 60, which snap into place. Extensions 62 and 64 overlie and are welded to energy directors 66 and 68 on upper ends of tape guides 70 and 72. Tape snubber 74 is shown in its molded form. Before the tape is installed, the snubber 74 is bent inward, as shown in dashed lines, so that its end 76 bears against guide 78. Tape passes outward through the slot formed between guide 78 and end 76 of the snubber, and a round guide 70 and over the guiding surfaces 80 and 82, which are cantilevered forward on the front of the base 12. Tape passes around the guide 68 and through the slot 84 onto the takeup reel. After the tape is installed and as the cassette is shut, sloped ramps 86 bear against vertical guides 88 to align the upper and lower halves of the cassette, with guide posts 92 fitting into receivers 94 before energy directors 66 and 68 and energy directors 98 along edges fuse and weld portions of the body.

In the preferred embodiment, the dust cover 24 is mounted on hinges 30 at the front of reinforced extensions 42 on upper portions of the side walls 18.

Figure 4A:
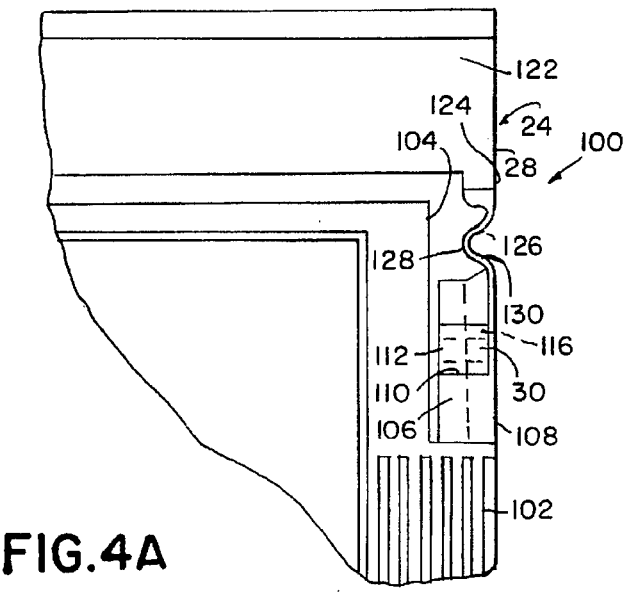
FIGS. 4A and 4B are a partial plan view and elevational view details of a preferred energy absorption zone in a video tape cassette.
Figure 4B:
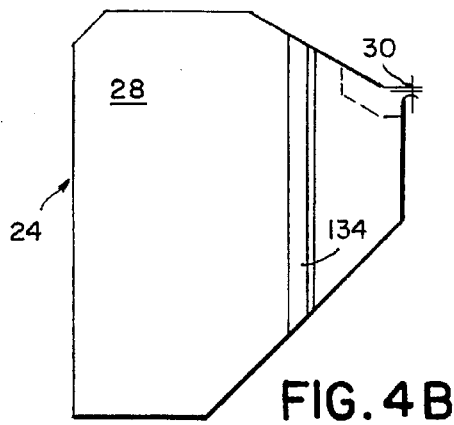

As shown in FIGS. 4A and 4B, the corner 100 of the top 14 has gripping and sliding lines 102 formed along one part thereof. An inward set portion 104 of the top and the side wall provides space for the hinge 30. The hinge 30 is mounted at the downward end of a ramp 106, which extends downward from the top. The thickness of the side wall 108 of the cover is continued under the ramp and shortly forward of the edge 110 of the flat hinge area 112.

A thickness 114 similar to the thickness 108 of the cover portion extends under the flat area. A similar thickness 116 extends under the forward portion of the flattened area 112, which forms the hinge 30. The thickness 118 of the dust door 24 continues in the side area of the sloping portion 120 of the dust door which leads to the hinge. The dust door has a top 122 with a rearward extending portion 124 of the side wall, which terminates in a thin corrugation 126 which forms the energy absorption zone 40. The serpentine energy absorption zone has a wall thickness 128, which is less than the wall thickness 118 of the dust door.

In one example, the wall and corrugation thicknesses are about 0.060 and 0.015 inches, respectively. Walls 130 of the serpentine corrugation section are of equal thickness, have relative slopes to each other of about 40°, and form outer and inner grooves 134 and 136 with radiuses of about 0.015 inch. As a dust door 24 receives an impact, energy is absorbed in the corrugated energy absorption zone 40.

Figure 5A:
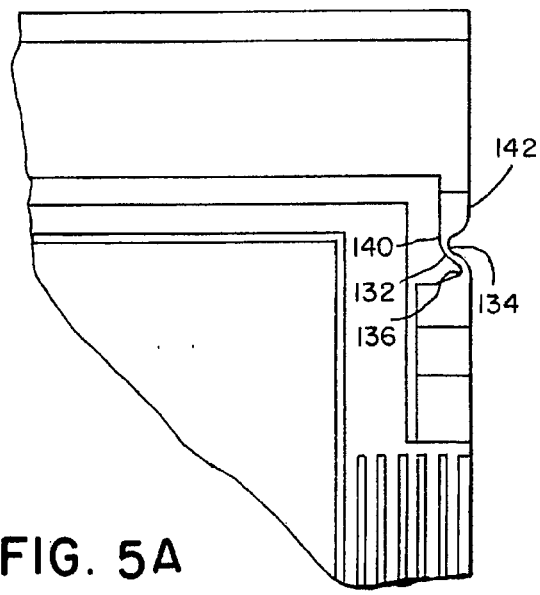
FIGS. 5A, 5B, 6A and 6B are partial plan and elevational details of alternate energy absorption zones.
Figure 5B:
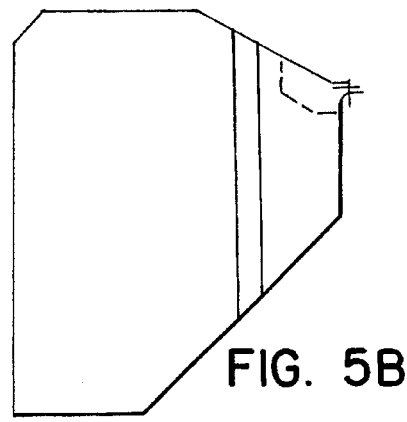

As shown by FIGS. 5A and 5B, an energy absorption zone 40 may be formed from a single corrugation 132, with an outer groove 134 and an inner groove 136.

The wall thickness may be about 0.060 inch, as shown between the inner surface 140 and the outer surface 142 of the rearward extension on the door 24, and the wall thickness of the grooves and the intermediate portion of the corrugation 134 may be about one quarter of that thickness or about 0.015 inch. The radius of the grooves 134 and 136 may be about 0.015 inch.

Figure 6A:
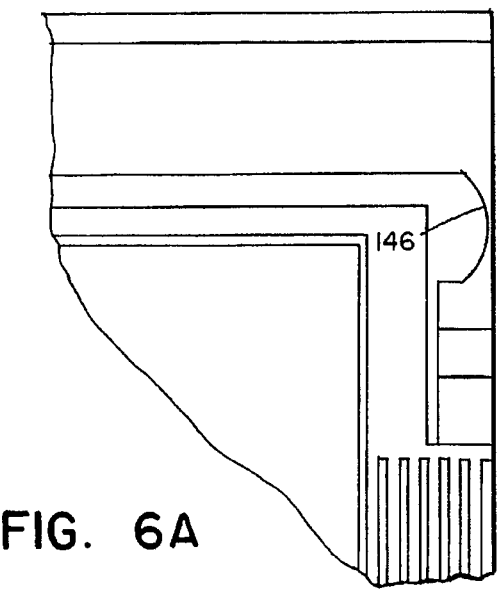
Figure 6B:
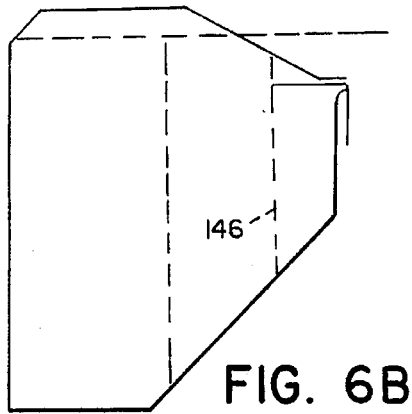

As shown in FIGS. 6A and 6B, a single groove 146 may be employed. The wall thickness at the bottom of the groove may be about 0.015 inch, and the relatively large radius of the groove may be about 0.180 inch. The grooves which extend between the upper and lower sloping edges 36 and 38 of the side 24 of the dust cover provide energy absorption upon impact.

Figure 7A:
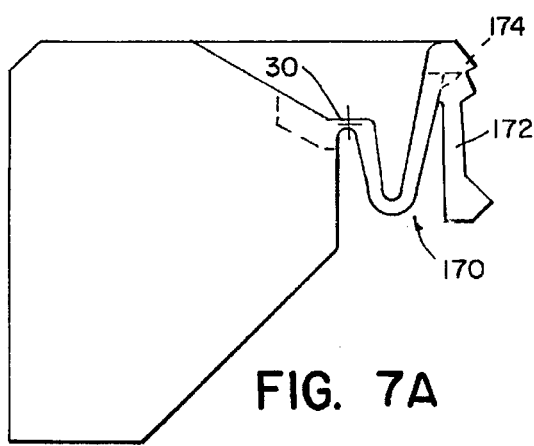
FIG. 7A, 7B, 8A, 8B, 9A and 9B are partial side elevational and plan details of alternate energy absorption zones.
Figure 7B:
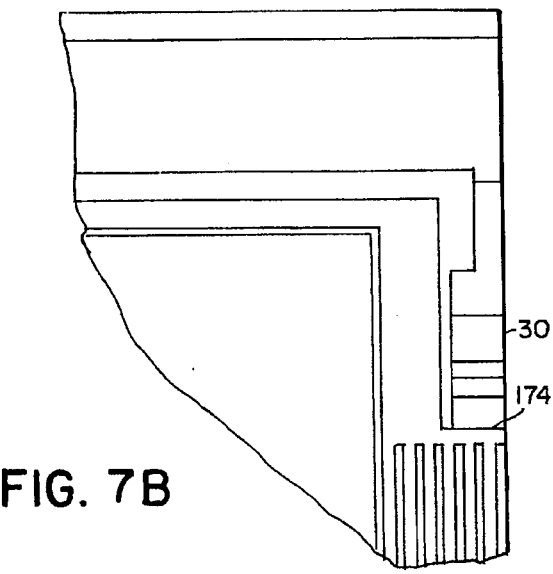

As shown in FIGS. 7A and 7B, an energy absorber 170 is formed between a front portion 172 of the side wall and the hinge 30. The energy absorber arm 170, which is positioned forward and slightly outward from its upper contact area 174 with the side wall, has a groove with a radius of about 0.020 inch, and has a wall thickness over the corrugated section of about 0.040 inch. Upon impact, energy is absorbed by the energy absorption arm 170 when transferred toward the body 20 by the dust door 24.

Figure 8A:
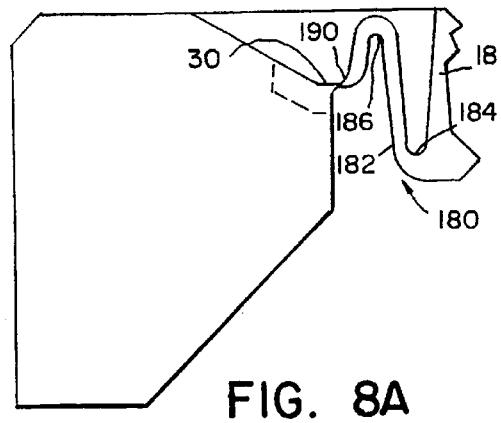
Figure 8B:
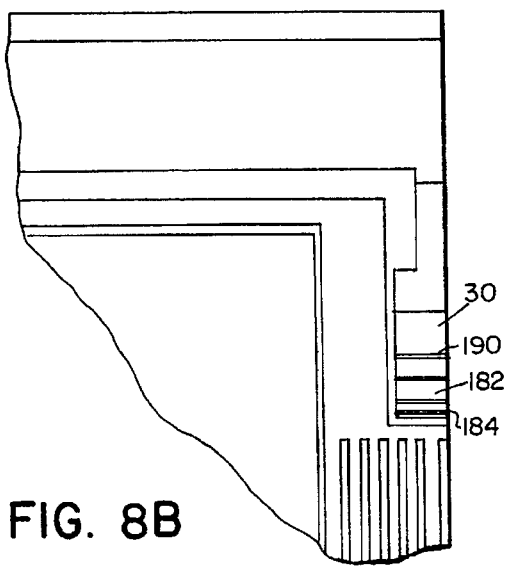

As shown in FIGS. 8A and 8B, an energy absorber 180 may be formed on the front of the side wall 18. Energy absorption arm 182 has a wall thickness of about 0.040 inch, and is formed as a corrugation with a horizontally extending groove having a radius of about 0.020 inch at the front of the side wall, and a second horizontally extending groove with a radius 186 of about 0.014 inch. A downward extending corrugated portion 188 ends in a radius of about 0.30 inches.

Figure 9A:
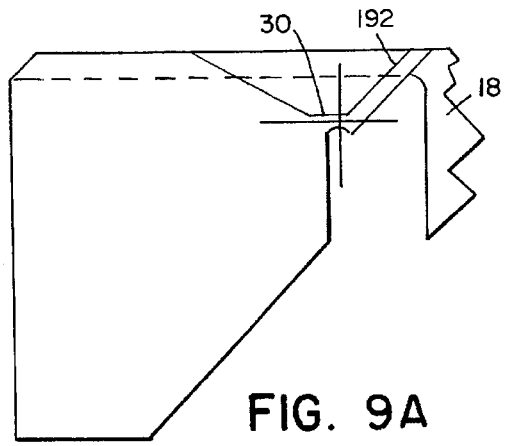
Figure 9B:
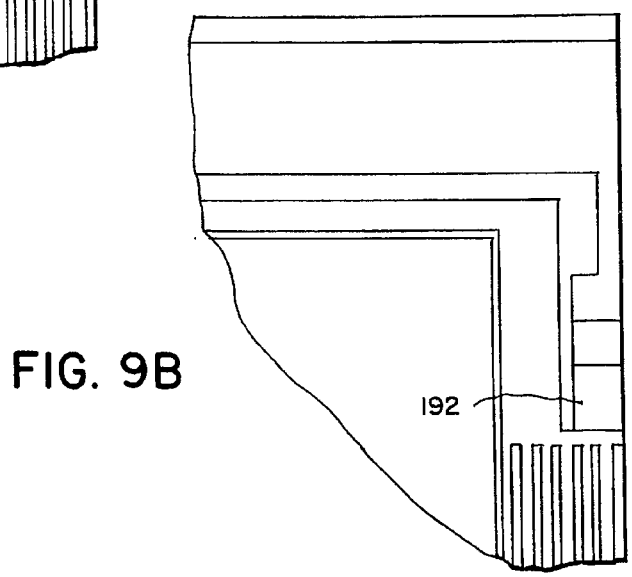

FIGS. 9A and 9B show an alternate form of the invention in which a thin energy absorbing arm 192 extends between the side wall 18 and hinge 30. The energy absorption wall has a reduced thickness of about 0.35 inch, and intersects with the side wall 18 in a radius of about 0.30 inch.

In the preferred embodiment, the energy absorption zone is formed with thin vertical corrugations or wall elements in the sides of the cover. In the alternate form, the energy absorption zone is formed with thin horizontal corrugations or wall elements in a portion of the body which is connected to the hinge.

While the invention has been described with reference to specific embodiments, modifications and variations of the invention may be constructed without departing from the scope of the invention, which is defined in the following claims.

We claim:

1. A video cassette apparatus comprising a base, a top, rear wall and side walls connected to the base and the top, forming a body having a frontal tape-exposing area, a dust door for covering the tape-exposing area integrally formed living hinges connecting the body and the dust door for permitting the dust door to move between an upward tape-exposing position and a downward tape-covering position, and energy absorption zones positioned near the living hinges for absorbing impact energies and reduce transmission of impact energies between the door and body through the hinges.

2. The apparatus of claim 1, wherein the energy absorption zones are integrally constructed in the dust door.

3. The apparatus of claim 2, wherein the dust door has a frontal tape-covering wall and sides extending rearward from the frontal tape-covering wall, wherein the hinges are connected to the sides of the dust door and wherein the energy absorption zones are in the sides near the hinges.

4. The apparatus of claim 3, wherein the sides have inner and outer surfaces, and the energy absorption zones are formed as parallel grooves oppositely extending from the outer and inner surfaces of the sides.

5. The apparatus of claim 4, wherein an outer groove is formed in an outer surface of each side and parallel inner grooves are formed on inner surfaces of each side.

6. The apparatus of claim 5, wherein the grooves extend generally parallel to the rear wall and perpendicularly to the base and top.

7. The apparatus of claim 6, wherein the grooves extend fully between upper and lower edges of the dust door sides.

8. The apparatus of claim 1, wherein the body has extensions connected to the hinges, and the energy absorption zones are formed in the body of the cassette near the hinges.

9. The apparatus of claim 8, wherein the energy absorption zone comprises a thin arm extending downwardly and then upwardly to the hinge forming an upward opening rounded groove.

10. The apparatus of claim 8, wherein the energy absorption zone comprises an upward extension and a downward extension connected to the upward extension, and forming therebetween a downward opening groove, and wherein the hinge is connected to a remote end of the downward extension.

11. The apparatus of claim 10, further comprising an upward opening rounded groove extending between the body and the upward extension.

12. The apparatus of claim 8, wherein each extension comprises a relatively thin, downward extending energy absorption zone forming a rounded downward opening groove between the side wall and the downward extension.

* * * * *